9665X
E. S. Root.
Horse Rake.
Nº
Patented May 17, 1836.
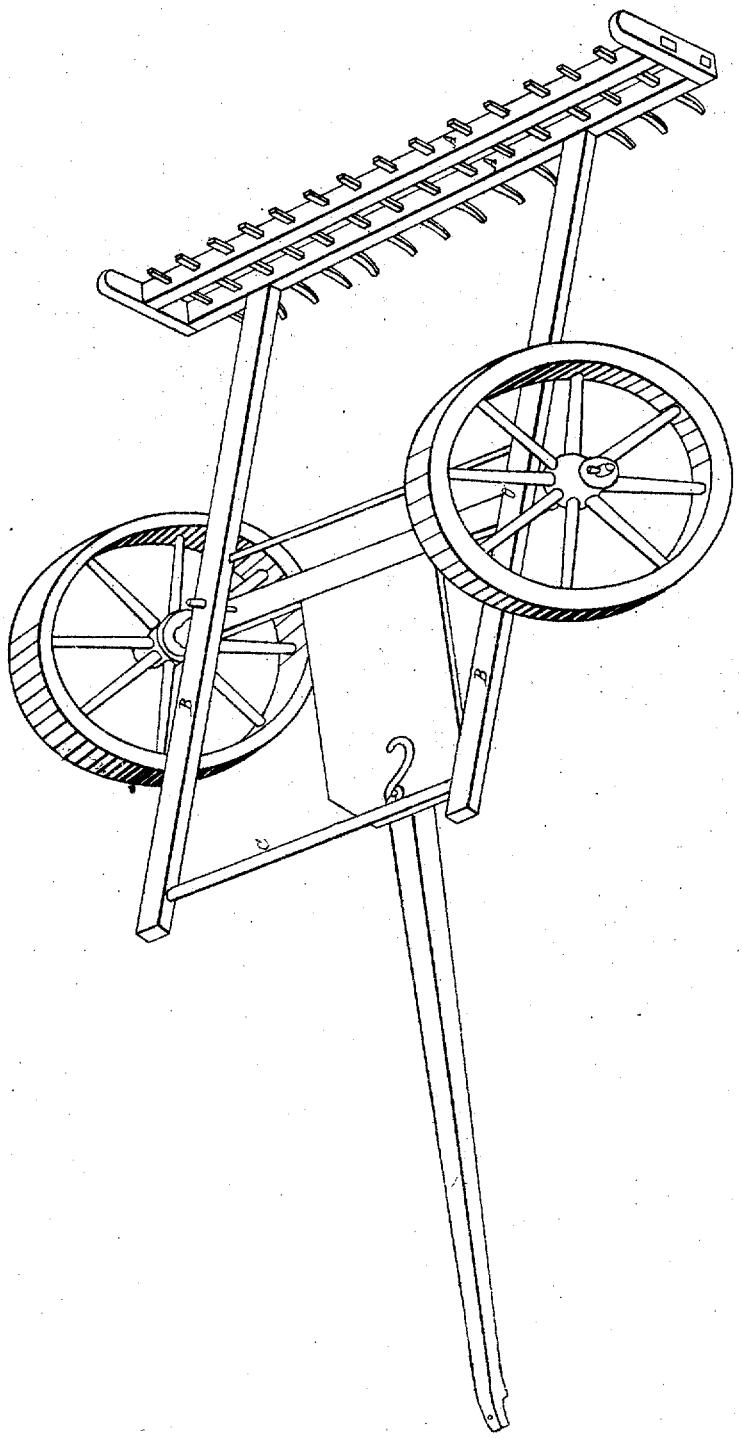

Erastus S. Root
Letters Patent
361 9665X

The schedule referred to in these Letters Patent and mak
ing part of the same containing a description in the words
of the said Erastus S. Root himself of his improvement
in the Horse Rake for Hay or Grain.
To all to whom these presents shall come—
Be it known that I Erastus S. Root of the town of Mount
Moris County of Livingston and State of New York have
invented a new and useful improvement in the horse Rake
for hay or grain and that the following is a full and ex-
act description thereof. The said Rake is to be twelve
feet in length. The teeth of wood and about three feet
long. said rake to be attached either to wheels or run
ners and to be built as follows. The head of said rake to be
formed of two string pieces parallel with each other about
eighteen inches apart. said pieces to be framed into oth-
er pieces at the ends. said Rake is to be raised by two
levers about ten feet in length, framed into the string
pieces or lower piece and made permanent by braces
from the levers to the string pieces. said levers to enter
the string pieces about three feet from each end and to
be fastened to the axletree of the carriage, or a piece
of timber lying across the runners. in the following manner
1st By Eyebolts near the shoulder of the axletree and about
the centre of the levers. or by boring holes through the levers
and slipping them on the ends of the axletree outside
of the hubs. or if on runners by slipping the levers on the
ends of the timbers lying across the runners. Carriage to be
built after the manner of ordinary carriages. or said Rake
can be attached to any carriage. The person making use of
Rake stands upon the fore part of the carriage and manages the 186 9865X the rake by a cross piece on the ends of the lever which gives the individual complete control over the rake either to raise it or to hold it down by means of the lever. What I claim as my own invention in the before mentioned rake and not previously known is the manner of raising the rake and also the manner of attaching it to wheels or runners, or any other carriage, said rake being so constructed as that it may be attached to the fore wheels of a one horse waggon Witnesses
Chas. M^c Namee
Chs M. Slatter Erastus S. Root 40 [illegible]

[illegible]

[illegible] May 17th 1836

Drawing